US006934615B2

United States Patent
Flann et al.

(10) Patent No.: US 6,934,615 B2
(45) Date of Patent: Aug. 23, 2005

(54) METHOD AND SYSTEM FOR DETERMINING AN EFFICIENT VEHICLE PATH

(75) Inventors: Nicholas Simon Flann, Smithfield, UT (US); Sarah Ann Gray, Providence, UT (US); Shane Lynn Hansen, Smithfield, UT (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 10/446,345

(22) Filed: May 28, 2003

(65) Prior Publication Data

US 2004/0193349 A1 Sep. 30, 2004

Related U.S. Application Data

(63) Continuation-in-part of application No. 10/403,681, filed on Mar. 31, 2003.

(51) Int. Cl.[7] .............................................. G01C 22/00
(52) U.S. Cl. ........................ 701/50; 701/202; 701/209; 56/10.2 A; 172/2
(58) Field of Search .......................... 701/50, 202, 209; 56/10.2 A; 172/2

(56) References Cited

U.S. PATENT DOCUMENTS

| 5,486,822 | A | * | 1/1996 | Tenmoku et al. | 340/995.22 |
|---|---|---|---|---|---|
| 5,528,888 | A | * | 6/1996 | Miyamoto et al. | 56/10.2 F |
| 5,648,901 | A | | 7/1997 | Gudat et al. | 364/424.027 |
| 5,684,476 | A | | 11/1997 | Anderson | 340/988 |
| 5,751,576 | A | * | 5/1998 | Monson | 700/83 |
| 5,870,564 | A | * | 2/1999 | Jensen et al. | 709/241 |
| 5,955,973 | A | | 9/1999 | Anderson | 340/988 |
| 5,974,347 | A | | 10/1999 | Nelson | 701/22 |
| 5,978,723 | A | | 11/1999 | Hale et al. | 701/50 |
| 6,088,644 | A | * | 7/2000 | Brandt et al. | 701/50 |
| 6,141,614 | A | * | 10/2000 | Janzen et al. | 701/50 |
| 6,236,924 | B1 | | 5/2001 | Motz et al. | 701/50 |
| 6,263,277 | B1 | * | 7/2001 | Tanimoto et al. | 701/209 |
| 6,336,051 | B1 | * | 1/2002 | Pangels et al. | 700/50 |
| 6,385,515 | B1 | | 5/2002 | Dickson et al. | 701/28 |
| 6,445,983 | B1 | | 9/2002 | Dickson et al. | 701/23 |
| 2004/0068352 | A1 | * | 4/2004 | Anderson | 701/25 |

OTHER PUBLICATIONS

Makino et al., "Development of a Motion Planning System for an Agricultural Mobile Robot", SICE Jul. 1999, pp. 959–962.*

(Continued)

Primary Examiner—Michael J. Zanelli
Assistant Examiner—Eric M. Gibson

(57) ABSTRACT

A system and method for determining a path plan for a vehicle includes organizing a work area into partition areas based on at least one of an obstacle, a concavity, and an exclusion area associated with a work area. An external cost indicator is established for indicating the economic cost corresponding to the vehicle traversing from one partition area to another partition area for each possible permutation or potential combination of successive partition areas. The established external cost indicators are searched to determine a preferential order of traversing the partition areas. A preferential path plan is determined based on the internal path plan of each partition and a transfer path plan of transferring from a prior partition to a latter partition until each partition in the work area is traversed.

35 Claims, 12 Drawing Sheets

OTHER PUBLICATIONS

Gray, Sarah A., Planning and Replanning Events for Autonomous Orchard Tractors [online], 2001 [retrieved on Mar. 17, 2003]. Retrieved from the Internet:<URL: http://www.autonomoussolutions.com/press.html>.

Gunderson, R. W., Torrie, M. W., Flann, N. S., Neale, C. M. U., Baker D. J., GIS and the Computer–Controlled Farm [online], Jul. 2000. Retrieved from the Internet<URL: http://www.autonomoussolutions.com/press.html>.

Gray, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet <URL: http://www.autonomoussolutions.com/press.html.

Gray, Sarah, What is Path Planning [online], Aug. 17, 2002 [retrieved on Mar. 17, 2003]. Retrieved from the Internet <URL: http://www.autonomoussolutions.com/press.html.

"Computer Generation of Efficient Farm Field Courses", a thesis submitted to the Faculty of Graduate Studies and Research In Partial Fulfillment of the requirements for the degree of Electrical Engineering, Faculty of Engineering, University of Regina, By Gin Liu, Mar. 1988.

Dana S. Nau, Vipin Kumar and Laveen Kanal, *General Branch and Bound and Its Relation to A\* and AO\** Artificial Intelligence, vol. 23 No. 1, 1984, pp. 29–58.

F. Glover, *Tabu Search–Part I*, ORSA Journal on Computing, vol. 1, No. 3, 1989, pp. 190–206.

F. Glover, *Tabu Search–Part II*, ORSA Journal on Computing, vol. 2, No. 1, 1990, pp. 4–32.

Richard E. Korf, *Depth–First Iterative–Deepening: An Optimal Admissible Tree Search*, Artificial Intelligence, vol. 27, No. 1, 1990, pp. 97–109.

Richard E. Korf, *Linear–space best–first search*, Artificial Intelligence, vol. 62, No. 1, 1993, pp. 41–78.

\* cited by examiner

METHOD AND SYSTEM FOR DETERMINING AN EFFICIENT VEHICLE PATH

This application is a continuation-in-part of U.S. application Ser. No. 10/403,681, entitled, A PATH PLANNER AND A METHOD FOR PLANNING A PATH OF A WORK VEHICLE, filed Mar. 31, 2003 (pending), and this application is entitled to the benefit of the foregoing prior application under 35 U.S.C. 120.

FIELD OF THE INVENTION

This invention relates to a method and system for determining an efficient vehicle path.

BACKGROUND OF THE INVENTION

An operator of a work vehicle may be exposed to chemicals, fertilizers, herbicides, insecticides, dust, allergens, exhaust fumes, environmental conditions, slopes, low-hanging branches, and other hazards or conditions that might be harmful or irritating to the operator. The work vehicle may perform a task or other work that involves traversing at least part of a work area in one or more rows. An operator may not be able to achieve precise row alignment of adjacent rows because of the limited perspective of a human operator from a work vehicle or other factors. The misalignment of rows may lead to excessive or inconsistent row overlap between adjacent rows, wasted fuel, and wasted time in performing a task. Where the work area comprises vegetation (e.g., grass) to be mowed or processed, misalignment of rows may produce a poor aesthetic appearance of the mowed or processed vegetation. Thus, a need exists for supporting the planning of a precise path of a work vehicle to facilitate unmanned operation of the work vehicle for mowing, cultivating, harvesting, planting, distributing fertilizer, distributing herbicides, distributing insecticides, spraying chemicals, mine-sweeping, performing agricultural work or performing other work operations.

SUMMARY OF THE INVENTION

In accordance with one embodiment of the invention, a system and method for determining a preferential path plan for a work vehicle includes organizing a work area into partition areas based on at least one of an obstacle, a concavity, and an exclusion area associated with the work area. An external cost indicator is established for indicating the economic cost corresponding to the vehicle traversing from one partition area to another partition area for each possible permutation or potential combination of successive partition areas. The established external cost indicators are searched to determine a preferential order of traversing the partition areas. A preferential path plan is determined based on the internal path plan of each partition and an external path plan of transferring from a prior partition to a latter partition until each partition in the work area is traversed.

DESCRIPTION OF THE PREFERRED EMBODIMENT

The mapped area refers to a work area of the vehicle, whereas the map object refers to a desired portion of the mapped area to be mowed, sprayed, harvested, treated, covered, processed or otherwise traversed to accomplish a task. The boundaries of the mapped area and the boundaries map object may be defined to be coextensive with each other, partially contiguous with each other or noncontiguous with each other.

If a work area has at least one of an obstruction, a concavity, and an exclusion area, the work area may be partitioned into one or more partitions to better traverse the work area. An internal path plan or intra-partition path plan refers to a path plan within a partition. A transfer path plan is a path plan segment between two partitions or to or from a single partition. An external path plan or extra-partition path plan refers to a group of transfer path plans that interconnect multiple partitions. The external path plan may be interrupted by one or more internal path plan or intra-partition path plans. For a work area that has an obstacle, concavity or an exclusion area, the preferential path plan may have a preferential external path plan and one or more preferential internal path plans that provide efficient energy consumption, time usage, and precision to cover at least part of the work area.

Figure 1:
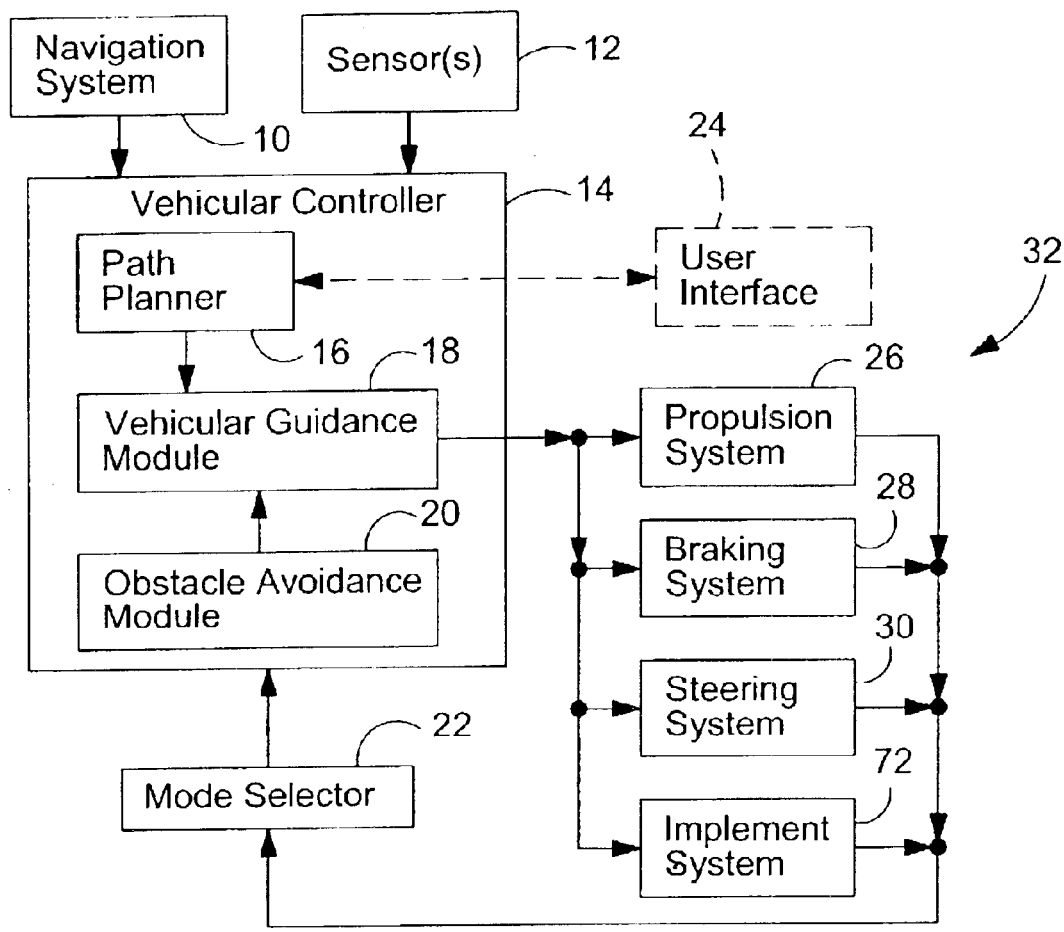
FIG. 1 is a block diagram of a vehicular control system that may incorporate or support a path planning method of this invention.

In accordance with one embodiment of the invention, FIG. 1 shows a block diagram of a system for controlling a vehicle. The work vehicle may comprise any agricultural vehicle, agricultural equipment, a combine, a harvester, a tractor, mower, lawn and garden equipment, a construction vehicle, construction equipment, demining equipment or other types of machines. A vehicular controller 14 is coupled to a navigation system 10 and one or more sensors 12. In one embodiment, the vehicular controller 14 is associated with a mode selector 22 for selection of one or more modes of operation of the vehicle. The vehicular controller 14 may communicate with a propulsion system 26, a braking system 28 or a steering system 30.

The navigation system 10 obtains location data (e.g., geographic position or geographic coordinates) of the vehicle with respect to a work area for the vehicle. The navigation system 10 may comprise a location-determining receiver (e.g., Global Positioning System (GPS) receiver with differential correction), a laser navigation system that interacts with several active transmitting beacons or passive reflective beacons at corresponding known fixed locations, or a radio frequency navigation system that interacts with several active transmitting beacons or passive reflective beacons at corresponding known fixed locations. A vehicle-mounted receiver of the laser navigation system or radio frequency navigation system may determine the time of arrival, the angle of arrival, or both, of electromagnetic signals (e.g., optical, infra-red or radio frequency signals) propagating from three or more beacons to determine location data for the vehicle as the vehicle moves throughout the mapped area. The navigation system 10 provides location data of the vehicle with respect to a reference location or in terms of absolute coordinates with a desired degree of accuracy (e.g., a tolerance within a range of plus or minus 2 centimeters to plus or minus 10 centimeters from the actual true location of the vehicle).

In one embodiment, the vehicular controller 14 comprises a path planner 16, a vehicular guidance module 18, and an obstacle detection/avoidance module 20. The path planner 16 is capable of planning a path of a vehicle based on input data, operator input, or both. A user interface 24 supports entry or loading of input data for use by the path planner 16. The user interface 24 may comprise one or more of the following: a keypad, a keyboard, a display, a pointing device (e.g., a mouse), and a graphical user interface 24. The user interface 24 is shown in dashed lines to indicate that it is optional and may be disconnected from the path planner 16 or vehicular controller 14 during normal operation of the vehicle once the preferential path plan is established or otherwise provided to the path planner 16.

The vehicular guidance module 18 guides the vehicle based on the path plan (e.g., preferential path plan) established by the path planner 16 or otherwise provided if an operator or user authorizes or activates the vehicular guidance module 18 to control operation of the vehicle. In one embodiment, the vehicular guidance module 18 facilitates operation of the vehicle in compliance with one or more suitable modes of operation. The vehicular guidance module 18 may control or provide control signals to at least one of a propulsion system 26, a braking system 28, a steering system 30, and an implement system 72 of the vehicle generally consistent with the path plan (e.g., preferential path plan) of the path planner 16, navigation input from the navigation system 10 and sensor input from one or more sensors 12, unless the path plan is overridden by the operator, by the vehicular controller 14, by the obstacle detection/avoidance module 20, by the mode selector 22 or by another control agent of the vehicle. For example, the vehicular guidance module 18 may receive input from the obstacle detection/avoidance module 20 that results in the vehicular guidance module 18, the obstacle detection/avoidance module 20, or both, controlling to at least one of a propulsion system 26, a braking system 28, a steering system 30, and an implement system 72 to avoid striking an obstacle or to avoid intruding into a predetermined no-entry or safety zone around the obstacle.

One or more sensors 12 are used for detecting one or more of the following items: (1) the presence of defined or undefined physical structures through pattern recognition or otherwise, (2) the boundaries of the mapped area and/or map object through optical or tactile sensing, (3) the presence of an obstacle that obstructs the planned path of the vehicle through ultrasonic sensors or otherwise, (4) the presence of people or animals in or near the work area, and (5) environmental conditions associated with the vehicle or its operation if the vehicle is operating in an autonomous mode or a semi-autonomous mode. Environmental conditions may include data on temperature, tilt, attitude, elevation, relative humidity, light level or other parameters.

In one embodiment, the mode selector 22 supports the selection of at least one of a first mode, a second mode, and a third mode based upon the operator input. For example, the first mode comprises an automatic steering mode, the second mode comprises a manual operator-driven mode, and the third mode comprises an autonomous mode. In a first mode, the vehicular guidance module 18 may control at least one of the propulsion system 26, braking system 28, steering system 30, and the implement system, while also allowing an operator to over-ride the automatic control of the vehicle provided by the vehicular guidance module 18 at any time during operation of the vehicle. Accordingly, if an operator interacts or commands at least one of the propulsion system 26, the braking system 28, and the steering system 30 during the first mode, the mode selector 22 may automatically switch from the first mode to the second mode to allow the operator virtually instantaneous control over the vehicle. In a second mode, an operator of the vehicle commands or activates at least one of a propulsion system 26, a braking system 28, a steering system 30, and an implement system 72 of the vehicle. In a third mode, the vehicular guidance module 18 is adapted to guide the vehicle based upon the planned path (e.g., preferential path) and the detection of the presence of the obstacle. Although the vehicle may have three modes of operation as explained herein, in an alternate embodiment, the vehicle may have any number of modes, including at least one autonomous or semi-autonomous mode. An autonomous mode is where the vehicle has sensors 12 and control systems that allow the vehicle to complete a predefined mission and to deviate from the mission to provide for safety compliance and acceptable interaction with the environment around the vehicle. A semi-autonomous mode represents an automatic steering mode or another partially automated mode in between a true autonomous mode and a manual mode.

Figure 2:
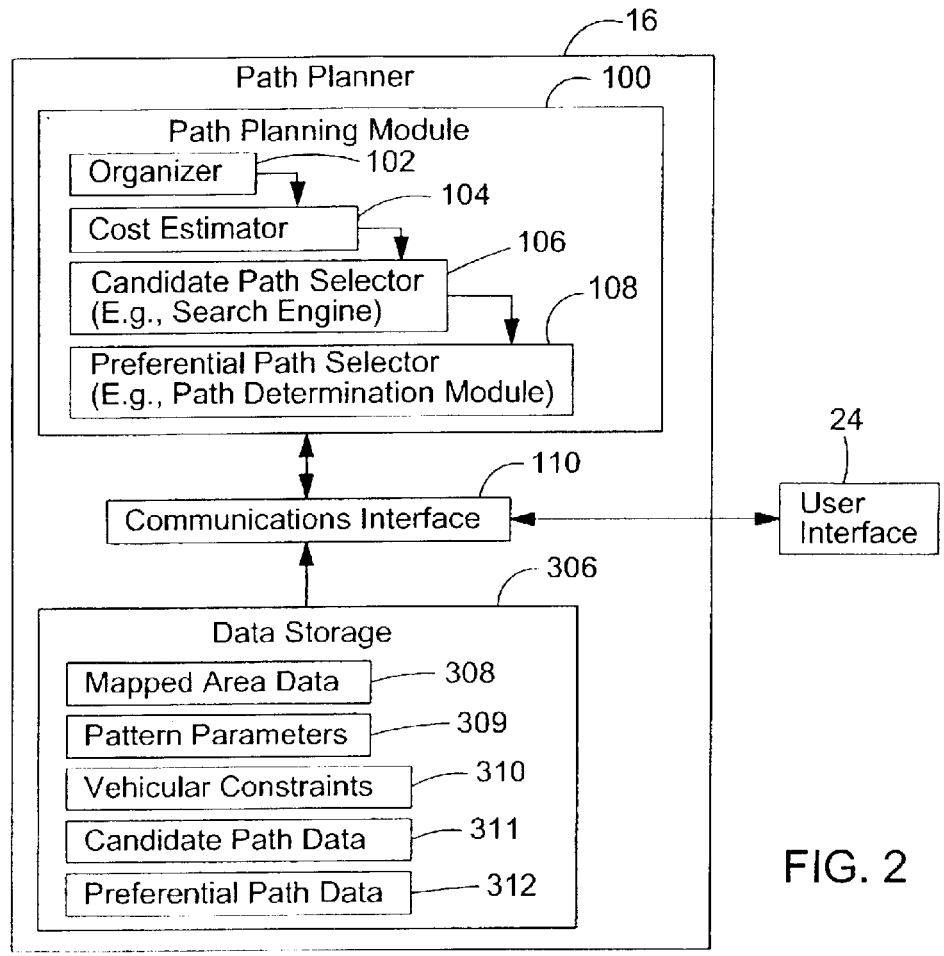
FIG. 2 is a block diagram that shows one possible illustrative embodiment of a path planner in accordance with the invention.

FIG. 2 shows a block diagram of a path planner 16 for determining a path plan (e.g., preferential path plan) of a vehicle. The path planner 16 comprises a path planning module 100, a communications interface 110, and data storage 306. The communications interface 110 supports communications between two or more of the following: the path planning module 100, the user interface 24, and data storage 306.

The path planning module 100 comprises an organizer 102 that provides data to the cost estimator 104. In turn, the cost estimator 104 outputs data to a candidate path selector 106. The candidate path selector 106 communicates with, or otherwise cooperates with, a preferential path selector 108.

The data storage 306 may be configured to store and retrieve one or more of the following data: mapped area data 308, pattern parameters 309, vehicular constraints 310, candidate path data 311, and preferential path data 312.

An organizer 102 organizes a work area or mapped area into partition areas based on at least one of an obstacle, a concavity, and an exclusion area associated with a work area. A cost estimator 104 establishes (1) an external cost indicator (e.g., transfer cost indicator), (2) an internal cost indicator, or both. The external cost indicator indicates the economic cost corresponding to the vehicle traversing from one partition area to another partition area for each possible permutation or potential combination of successive partition areas. In contrast, the internal cost indicator represents the economic cost corresponding to the vehicle traversing candidate path plans within each corresponding partition of a work area.

A search engine searches the established external cost indicators and established internal cost indicators to determine a preferential external path plan and a preferential internal path plan, respectively. The preferential path plan may comprise a preferential order of traversing the partition areas. A path determination module 108 determines a path plan based on the internal path plan of each partition and an external path plan for transit to or from the partitions in the work area. The external path plan represents a series of transfer path plans, in which each transfers from a prior partition to a latter partition until each partition in the work area is traversed.

Each of the partition areas comprises a region selected from the group consisting of a generally polygonal region, a generally triangular region, a generally trapezoidal region, and a generally rectangular region. A partition area may be defined by a first boundary intersecting with adjacent path rows and defined by a second boundary intersecting with said adjacent path rows. The first boundary and the second boundary may intersect each other. The transfer cost indicator is based on the distance of a transfer path between a candidate prior partition and a candidate subsequent partition. The external cost indicator may be based on the sum of such transfer cost indicators for a desired portion (e.g., the entire portion) of the work area.

In one embodiment, the search engine is arranged to find a substantially global lowest cost of traversing candidate external path plans and candidate internal path plans. The global lowest cost is defined as a function of a remaining distance of the paths plus a cost of the paths traversed so far. The substantially global lowest cost is associated with a corresponding order of partition execution as the preferential order. The search engine may comprise a candidate path selector 106 and a preferential path selector 108.

In another embodiment, the search engine is arranged to find a substantially local lowest cost of traversing candidate external path plans and candidate internal path plans. The local lowest cost is estimated to be less than or equal to children local costs derived from predictive parameters associated with the local lowest cost. The substantially local lowest cost is associated with a preferential external path plan and a preferential internal path plan. The preferential external path plan has a corresponding order of partition execution as the preferential order. The preferential internal path plan comprises a series of generally parallel rows arranged at an defined angle with respect to a target axis. The target axis may be aligned at an angle from zero degrees to one hundred and eighty degrees from a border of the work area or a border of the map object, for example.

Figure 3:
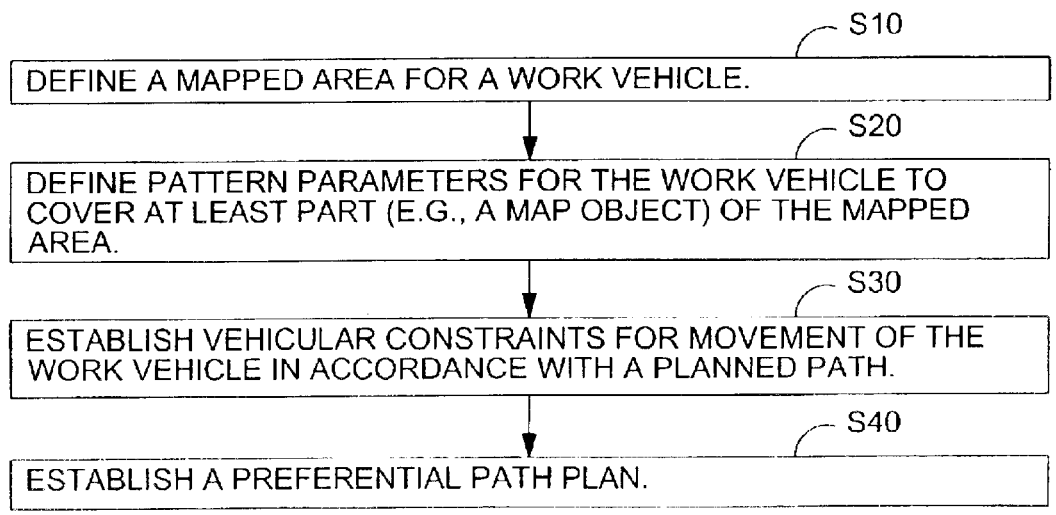
FIG. 3 is a flow chart of a method for establishing a framework of input data for path planning.

FIG. 3 shows a method for gathering input data for planning a path of a work vehicle. The method of FIG. 3 begins in step S10.

In step S10, a mapped area or work area is defined for a work vehicle. In one example, the mapped area or work area includes a field. The boundaries of the field may be defined by geographic coordinates at multiple locations spaced apart on the boundaries of the field. For example, the mapped area may be defined by traversing a boundary of the mapped area or a boundary of a map object within the mapped area with a navigation system 10 of the vehicle and recording location data for the boundary or perimeter of the mapped area, the map object, or both.

In step S20, pattern parameters are defined for the work vehicle to cover at least part (e.g., map object) of the mapped area or work area. The pattern parameters may represent a desired pattern or pattern contribution comprising one or more of the following: a pattern shape, pattern velocity, and pattern directional constraints. Pattern shapes may include any of the following shapes: generally spiral, generally contour, generally linear, generally boustrophedon, and back-and-forth straight sweep. Boustrophedon refers to a movement pattern in which the vehicle moves in opposite directions in adjacent rows that are generally parallel to one another. The desired velocity may include the desired velocity on the straight segments, the desired velocity on curved (e.g., semi-circular or circular) segments of the path, or both.

Pattern parameters for the travel path of the vehicle include one or more of the following: (1) whether or not alternate vehicular directions for adjacent parallel rows are permitted, (2) whether or not the same vehicular directions for adjacent parallel rows are permitted, (3) whether or not to stripe the grass, turf or vegetation in a mapped area or a portion thereof by alternating the vehicular direction for adjacent groups, where each group includes two or more adjacent parallel rows mowed in the same direction, (4) whether or not to complete a back and forth straight sweep in conformance with a particular row direction and target line, (5) whether to complete a contour path in conformance with a target contour, (6) under what circumstances is crossing of a previous path permitted by the vehicle (e.g., must the implement system or mowing blades be stopped or deactivated where the vehicle is a mower), (7) what degree of overlap is required for adjacent sweeps or rows for mowing grass or vegetation, and (8) whether the vehicular path can deviate from a continuous loop.

In step S30, vehicular constraints are established. The vehicular constraints pertain to the limitations or capabilities for movement of the work vehicle in accordance with the planned path. The vehicular constraints may comprise a vehicular width, a minimum turning radius, an initial vehicular position, an initial vehicular heading, and other specifications of the vehicle or an implement associated therewith. The vehicular constraints may also include the weight of the vehicle, the fuel consumption of the vehicle, the horsepower of the vehicle, the maximum speed of the vehicle, the minimum speed of the vehicle or other considerations. Although the various path plans shown in the figures represent path plans executed by a vehicle with an approximately zero turn radius, in alternate embodiments, other vehicular constraints or turning radii greater than zero may apply.

In step S40, a preferential path plan is established based on the defined parameters, vehicular constraints, and an efficiency target. The efficiency target represents a goal of reducing energy consumption, path distance, and path completion time or other efficiency factors.

Figure 4:
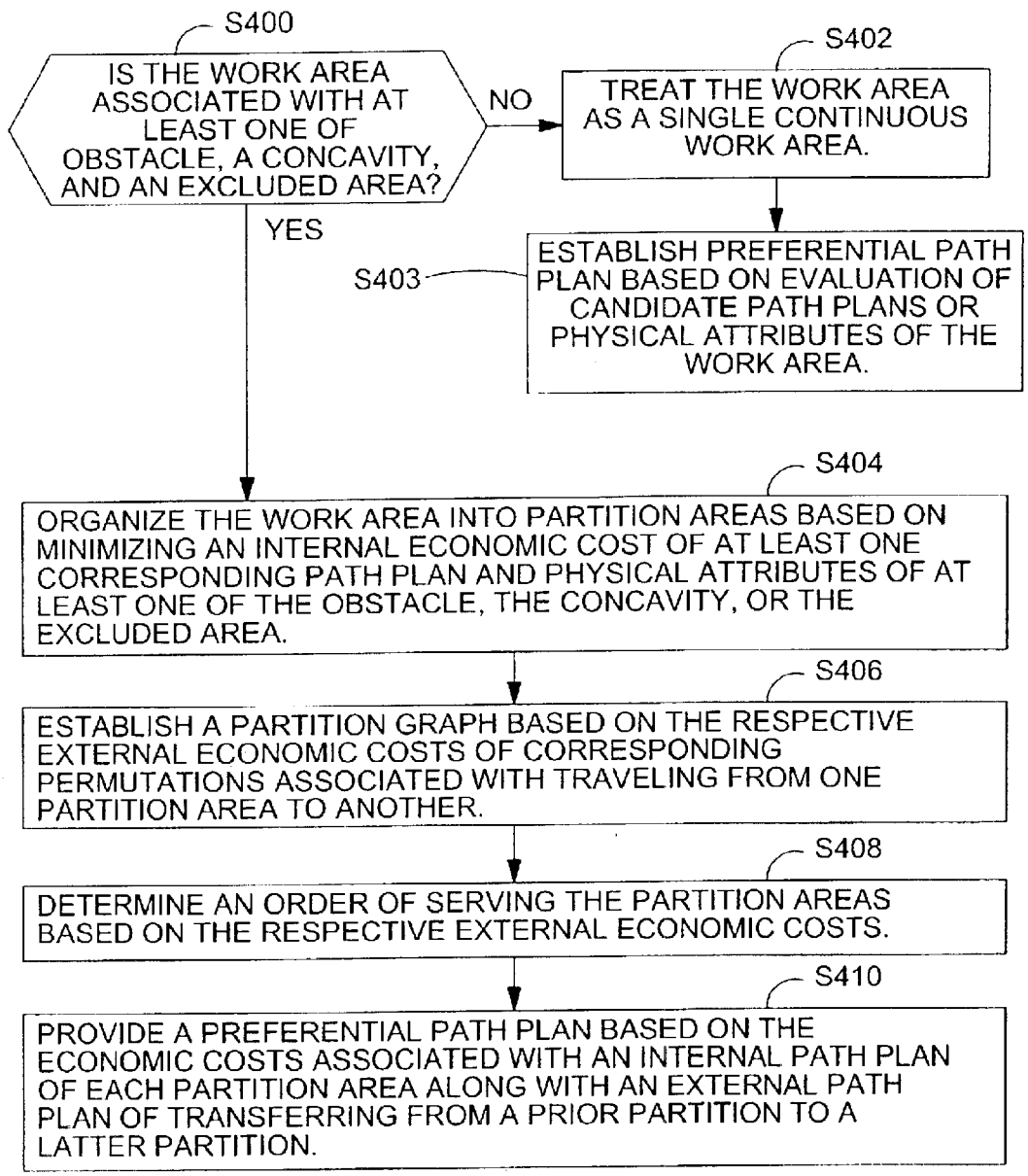
FIG. 4 is flow chart of a method for determining an efficient vehicle path.

FIG. 4 is a flow chart of a method for determining a preferential path plan for a vehicle. The method of FIG. 4 may be viewed as an expansion of step S40 of FIG. 3. The method of FIG. 4 begins in step S400.

In step S400, path planner 16 or a vehicular controller 14 determines if the work area is associated with one or more of the following: an obstacle, a concavity, and an excluded area. The obstacle may refer to a person, animal, object or anything that is in a planned vehicular path or is likely to come into the planned path of the vehicle. The concavity means any recessed aspect or recess in the border of the designated area. The excluded area refers to a no-entry zone within or associated with the designated area. If the path planner determines that the work area is associated with a least one of an obstacle, concavity, and an excluded area, the method continues with step S404. However, if the path planner determines that the work area is not associated with an obstacle, a concavity or an excluded area, the method continues with S402.

In step S402, the work area is treated as a single continuous work area. The work area may be treated as a continuous work area, subject to interruption and partitioning if an obstacle enters the work area during operation of the vehicle. For example, at fixed intervals or upon expiration of a timer during step S402, the method returns to step S400. Accordingly, if an obstacle enters the work area prior to or during the execution step S400, the work area may be subsequently partitioned, taking into account the previous work performed as one or more completed partitions, or portions thereof.

In step S403, a preferential path plan is established based on evaluation of candidate path plans or physical attributes the work area. Step S403 may be executed in accordance with several alternate techniques.

Under a first technique, step S403 may be carried out as the following group of steps: First, a graph is constructed, where each edge represents a point-to-point path and each node represents a choice point among connected paths. The graph consists of two kinds of edges: row-edges that cut a row across the work area, and border edges that travel along the borders of the work area or map object, connecting the row-edges together. Second, a search can be performed through this graph to identify a path that travels along all row-edges exactly once and is minimal in economic cost. In one embodiment, if the number of row-edges is n, then the size of this graph will be bound by $O(n^2)$ and the size of the search space will be bound by $O(a^n)$, where a >1.

Under a second technique, a designated portion of the work area to be covered is characterized by its dimensions, shape or other physical attributes. Physical attributes and corresponding canned patterns may be stored in a database, in a look-up table or otherwise. If stored physical attributes can be matched with, or are sufficiently similar to, the subject physical attributes of the work area, the corresponding canned path pattern may be retrieved as the preferential path plan. An example of a preferential path plan for a rectangular designated portion might be a series of diagonal, generally parallel rows that are connected by loops to cover the designated area.

In step S404, the organizer 102 organizes a work area into partition areas based on at least one of an obstacle, a concavity, and an exclusion area associated with a work area in conformance with minimizing economic cost of at least one corresponding internal path plan under one of various techniques. The configuration of each partition may vary based upon the placement, position, presence of the concavity, obstacle, and exclusion area. Each of the partition areas comprises a region selected from the group consisting of a generally polygonal region, a generally triangular region, a generally trapezoidal region, and a generally rectangular region. Each partition area is defined by a first boundary intersecting with adjacent path rows and defined by a second boundary intersecting with said adjacent path rows. The first boundary and the second boundary may intersect each other.

Under one technique, the partitions are selected consistent with a preferential internal path plan associated with each partition to optimize individually economic performance of each partition. Under a second technique, the partitions are selected consistent with preferential internal plans associated with a corresponding group of partitions to optimize collective economic performance of traversing a desired portion of the work area.

To select an internal path plan associated with a minimal economic cost, the path planner may establish an intra-partition graph in accordance with intra-partition rules, vehicular constraints or both. First, the paths are restricted under intra-partition rules in that adjacent row-paths in the region or partition are driven sequentially, where possible. Second, under the intra-partition rules, the vehicle simply turns around at the border and mows the next adjacent row-path where it can. This type of solution is suitable for most lawn mowers, fairway mowers, smaller tractors, and other maneuverable vehicles. The vehicle may have, but need not have, a zero turn radius as a vehicular constraint. Third, the vehicle restricts the back-and-forth path to follow the shape border between adjacent travel rows. One or more of the intra-partition rules may be modified, changed, deleted, and additional rules may be added.

In step S406, a cost estimator establishes a transfer cost indicator for indicating the external economic cost corresponding to the vehicle traversing from one partition area to another partition area for each possible permutation or potential combination of successive partition areas. For example, the cost estimator establishes a partition graph based on the respective economic costs of corresponding permutations associated with traveling from one partition area to another.

In step S408, a candidate path selector 106 determines an order of serving the partition areas based on the respective external economic costs. For example, the candidate path selector 106 (e.g., search engine) searches the established external cost indicators (e.g., transfer cost indicators) to determine a preferential order of traversing the partition areas. Step S408 may be executed in accordance with various alternate or cumulative techniques. Under a first technique, the search engine finds the preferential order based on a substantially global lowest cost of traversing candidate transfer path plans and candidate internal path plans, the global lowest cost defined as a function of a remaining distance of the paths plus a cost of the paths traversed so far. Under a second technique, the search engine finds the preferential order based on a substantially local lowest cost of traversing candidate transfer path plans and candidate internal path plans, the local lowest cost estimated to be less than or equal to children local costs derived from parameters associated with the local lowest cost. The internal path plan comprises a series of generally parallel rows arranged at a defined angle with respect to a target axis.

Under a third technique, a partition graph is searched to determine or find a preferential path among various possible candidate paths. Searching for a preferential path plan can be re-stated as finding a path through the partition graph such that each partition is visited once and the total cost is minimized. Once a partition solution is found, the actual path to be traveled can easily be computed by concatenating simple back-and-forth coverage paths within each partition with the border paths that connect them.

Under a fourth technique, an unreachable filter may be applied during the search of step S408 to prevent any isolated partition from using processing resources that would otherwise lead to "dead end" solutions after potentially expending considerable processing resources and time. Any partition that a vehicle cannot readily reach through a preferential path plan may be referred to as an isolated partition. The unreachable filter identifies isolated partitions and reduces or eliminates unreachable solutions from further consideration to conserve processing resources.

In step S410, a preferential path selector 108 provides a preferential path plan based on the economic costs associated with an internal path plan of each partition area along with an external path plan (e.g., transfer path plan) of transferring from a prior partition to a later partition. The determined preferential path plan is based on the internal path plan of each partition and a transfer path plan of transferring from a prior partition to a later partition until each partition in the work area is traversed. Each of the transfer cost indicators is based on the distance of a transfer path between a candidate prior partition and a candidate subsequent partition.

The determination of the preferential path plan may be based on one or more of the following input data: an area and a list of internal "keep-out" areas, vehicle characteristics, the required angle of the straight rows of the coverage path, and the required separation between adjacent rows of the coverage path. The foregoing inputs are applied to an algorithm that can rapidly or efficiently produce near-optimal coverage paths, given an area of operation, a vehicle, and a mission. Based on the application of the input data to the foregoing algorithm, the algorithm outputs a preferential path with one or more of the following characteristics: the path sweeps back-and-forth across the area; the path covers the whole area while staying out of the "keep-out" areas; and the path begins and ends on the borders of the outside area such that the total cost of the path is minimized. Further, in one embodiment, the memory requirements of the algorithm are minimized and the solution must be returned quickly (e.g., within a couple of seconds).

Figure 5A:
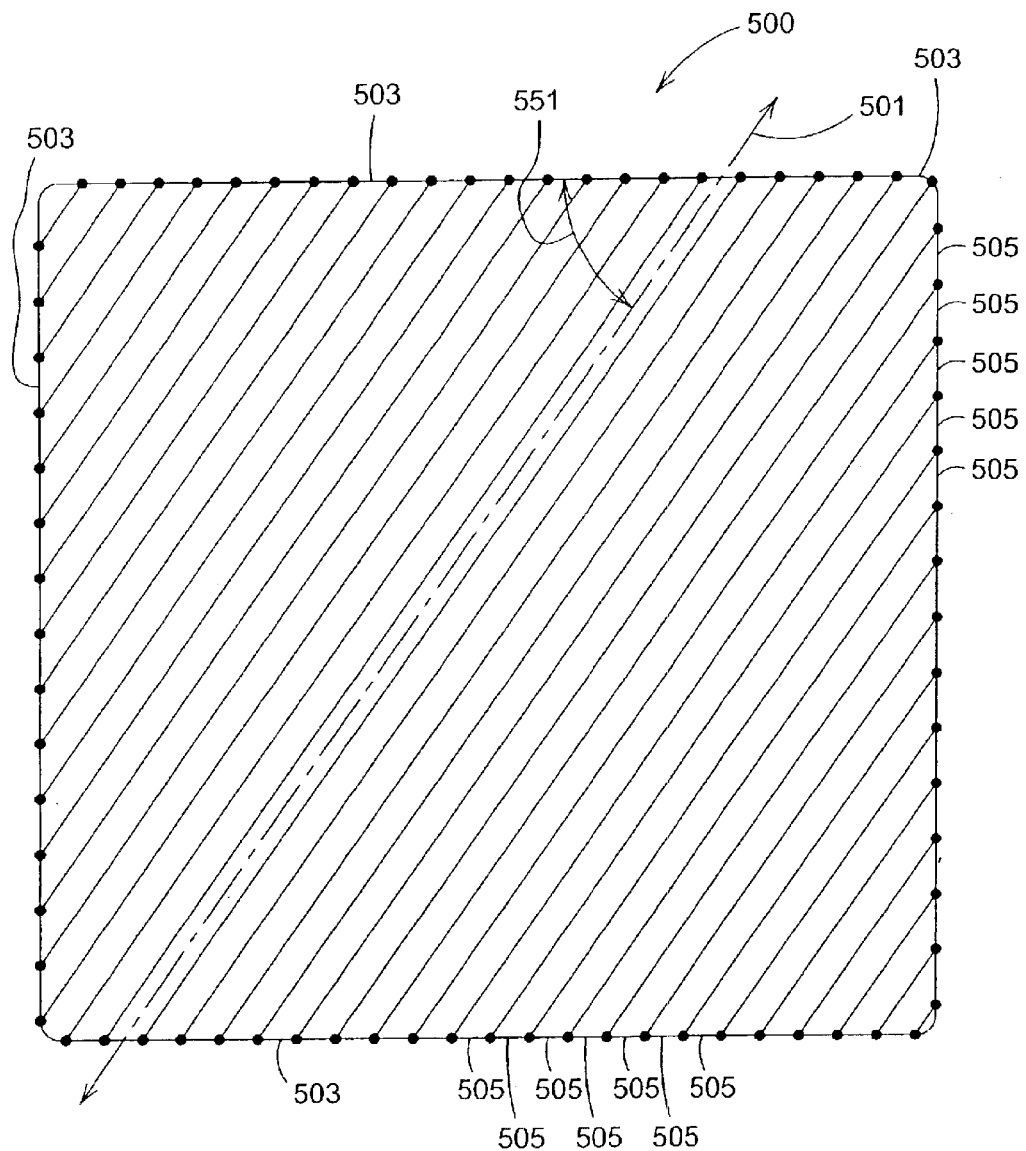
FIG. 5A shows an illustrated path plan for a work area that does not have an obstacle, a concavity or an exclusion area.

FIG. 5A illustrates a path plan 500 where no obstacle, no concavity, and no excluded area are present in a designated portion of the work area associated with the path plan 500. The designated portion 503 of the work area may be referred to as a map object. Although the boundary of the designated portion 503 is generally rectangular in FIG. 5A, it is understood that the boundary of the designated portion 503 may be shaped in a myriad of other possible ways. The boundary may vary based on local terrain or the assigned task for the work vehicle, for example.

A user may define a target axis 501 via the user interface 24 of a vehicular control system to align the preferential path plan with the target axis 501. The target axis 501 may be defined by an angle 551 between the target axis 501 and a boundary (e.g., a generally rectilinear border) of the designated portion of work area. A group of generally parallel rows of the path plan 500 may be aligned or registered with respect to the target axis 501 in a generally parallel manner. At the boundary of the designated portion 503, the work vehicle transitions from one row to the next adjacent row by a transition path 505 along the boundary of the designated portion 503 of the work area. In an alternate embodiment, the transition paths may be replaced by loops, arches or turns.

In FIG. 5A, because the designated portion 503 within the work area has no concavity and there are no internal obstacles, a simple continuous alternating path is possible that starts at one corner of the designated portion 503 and finishes at an opposite corner. The alternating path consists of one or more generally parallel rows along which the work vehicle is arranged to travel. The path planning problem and solution illustrated in FIG. 5A may be referred to as a primitive problem and a primitive path plan, respectively, because a path plan 500 (e.g., a preferential path plan) can be found without searching among various possible candidate paths. The path plan 500 can be constructed by simply traveling back and forth along adjacent row-paths to cover the designated portion 503.

Figure 5B:
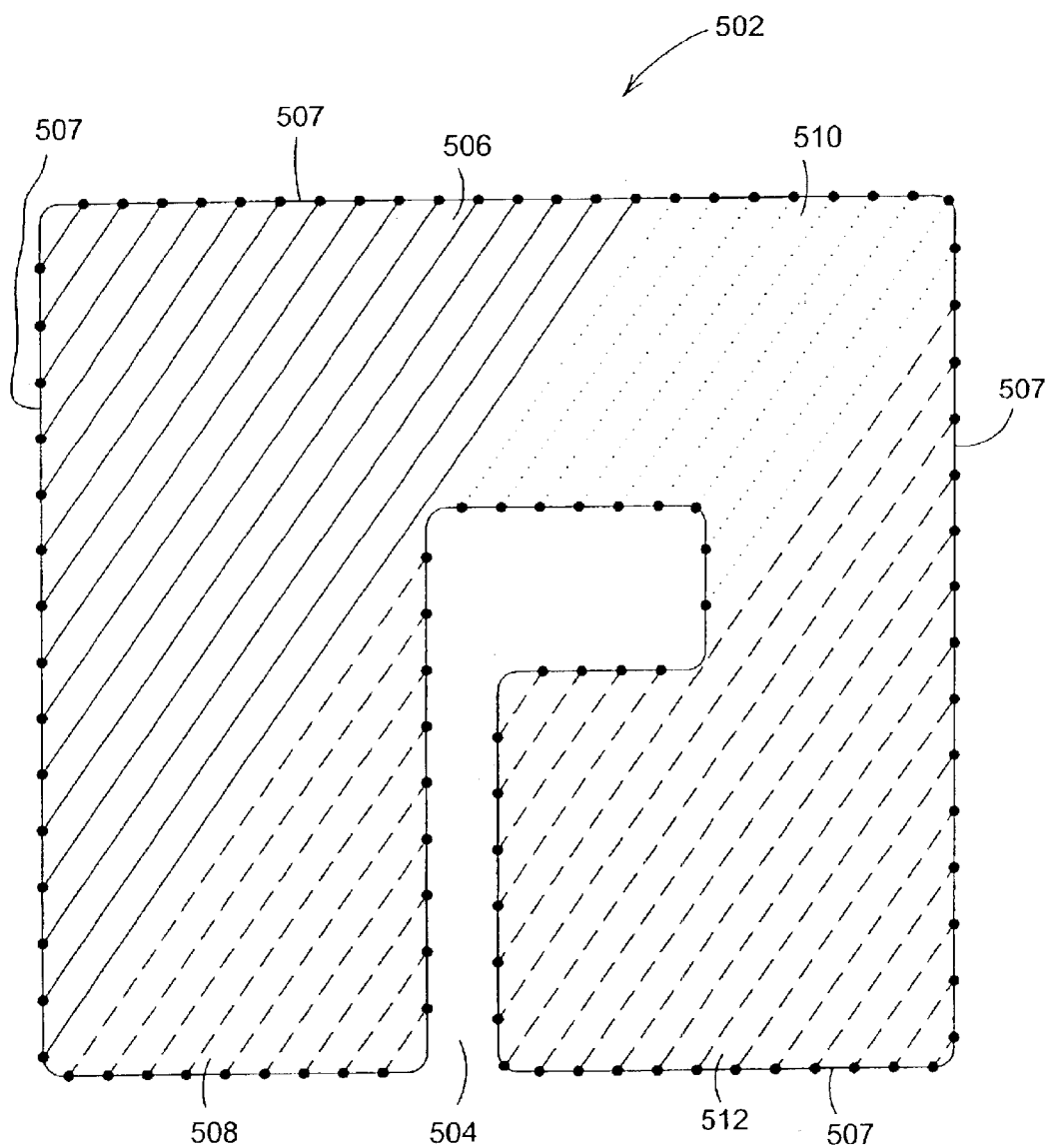
FIG. 5B shows an illustrative path plan for a work area having a concavity.

FIG. 5B illustrates a preferential path plan 502 for a map object 507 of a work area with a concavity 504. A map object 507 or work area with a concavity may be referred to as a convex region. The preferential path plan 502 is divided or decomposed into several regions or partitions (506, 508, 510, and 512). Although the partitions are shown as generally triangular or generally polygonal, other shapes may be used. The partitions are ordered in a sequence of completion for the preferential path plan that is consistent with efficient or economic consumption of vehicular energy or fuel of the work vehicle.

Although the partitions include a first partition area 506, a second partition area 508, a third partition area 510, and a fourth partition area 512, any number of partitions equal to or greater than one may be used to cover or service a map object 507 within a work area. The actual number of partitions for any work area or map object 507 will depend upon the physical characteristics of the map object 507 and the physical characteristics of any concavity 504 associated with the map object 507. The physical characteristics include size, shape, dimensions, orientation, and location, among other things.

The first partition area 506 is indicated by solid lines. The second partition area 508 is indicated by dashed lines. The third partition area 510 is indicated by dotted lines. The fourth partition area is indicated by dashed lines 512. Each partition area (506, 508, 510, and 512) is associated with a corresponding internal economic cost or intra-partition economic cost. For example, the intra-partition economic cost may be based upon the total length of the vehicular path segment within any corresponding partition, the total energy consumption of the vehicle to cover the partition, minimization of the total number of turns required to serve a corresponding partition or another suitable measure of efficient performance of the work vehicle. The aggregate internal economic costs of all partitions may be minimized by selecting suitable partition shapes as previously described in conjunction with FIG. 4. Accordingly, the preferential path plan of FIG. 5B may require a search among various possible candidate path plans to optimize or evaluate the aggregate internal economic costs.

Figure 5C:
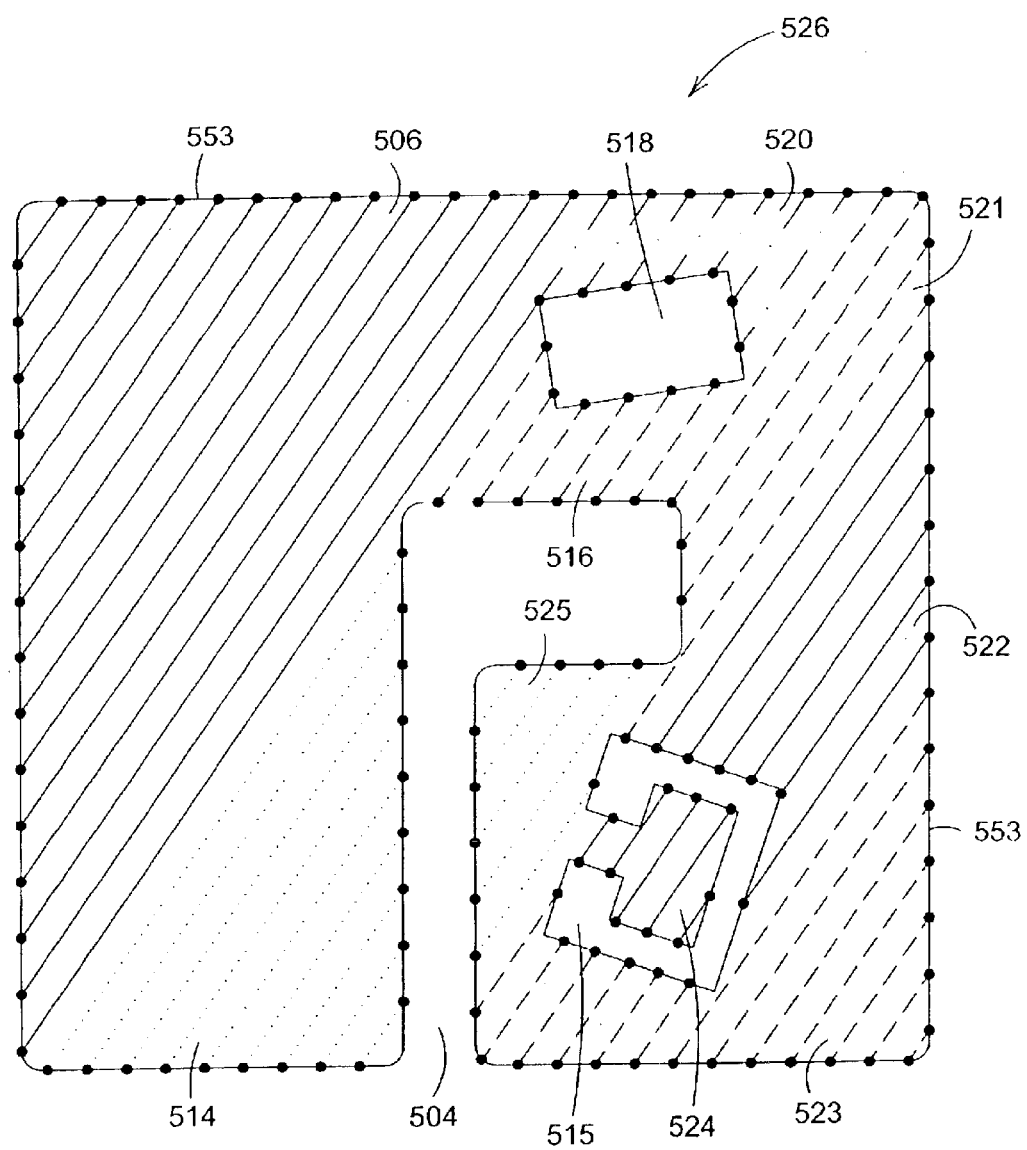
FIG. 5C shows an illustrative path plan for a work area having a concavity, an obstacle, and an exclusion area.

FIG. 5C illustrates a designated area 553 of a work area with a concavity 504, an obstruction 518, and an exclusion area 515. Accordingly, the designated area 551 is decomposed or broken down to even a greater number of partitions than those of FIG. 5B. Although FIG. 5C includes a first partition 506, a second partition 514, a third partition 516, a fourth partition 520, a fifth partition 521, a sixth partition 522, a seventh partition 523, an eighth partition 524, and a ninth partition 525, one or more partitions may be used to service the designated area 553. Different line types are used in FIG. 5C to facilitate distinguishing the different partitions from one another. The first partition 506 is shown as solid lines. The second partition 514 is shown as dotted lines. The third partition 516 is shown as dashed lines. The fourth partition 520 is shown as alternating dot-dash lines. The fifth partition 521 is shown as dashed lines. The sixth partition 522 is shown as solid lines. The seventh partition 523 is shown as dashed lines. The eight partition 524 is shown as solid lines, whereas the ninth partition 525 is shown as dotted lines.

The concavity 504 of FIG. 5C leads to the bifurcation of the generally parallel rows of the preferential path plan 526. Similar bifurcations occur when generally parallel row-paths of the path plan 526 intersect with obstacle 518. The bifurcation may define equivalence classes of row-paths that are instances of primitive path plans, analogous to the primitive path plan 500 of FIG. 5A. Each equivalence class of row-paths may be called a partition.

Here, each intra-partition path plan or internal path plan may be represented as a primitive path plan in a continuous work area that is free of any obstructions, excluded areas, and any concavities. The primitive path plan may be represented as a series of back-and-forth paths. The preferential path plan 526 of FIG. 5C may be defined as a compilation of such primitive internal path plans. In this way, a complex path planning problem may be reduced to a set of related primitive problems that can be represented compactly and searched quickly to determine a preferential path plan 526.

The evaluation of equivalence classes may be used to determine the scope of the boundaries of each partition of the work area. Two adjacent row-paths $r_j$ and $r_{j+1}$ are in the same equivalence class (or the same partition) if and only if: (a) the shape touched by the top of $r_j$ is the same shape touched by the top of $r_{j+1}$; (b) the shape touched by the bottom of $r_j$ is the same shape touched by the bottom of $r_{j+1}$; and (c) there are no intervening touches by any row-paths between $r_j$ and $r_{j+1}$ on both touched shapes. The top and bottom of a row-path may refer to the two ends.

A partition is a set of adjacent row-edges that satisfy the equivalence relation defined above. A partition $p_i$ has some important attributes: Parity($p_i$) either odd or even based on the number of row-paths, FirstShape($p_i$) the shape on one side of the partition, and SecondShape($p_i$) the shape on the other side of the partition.

Figure 6A:
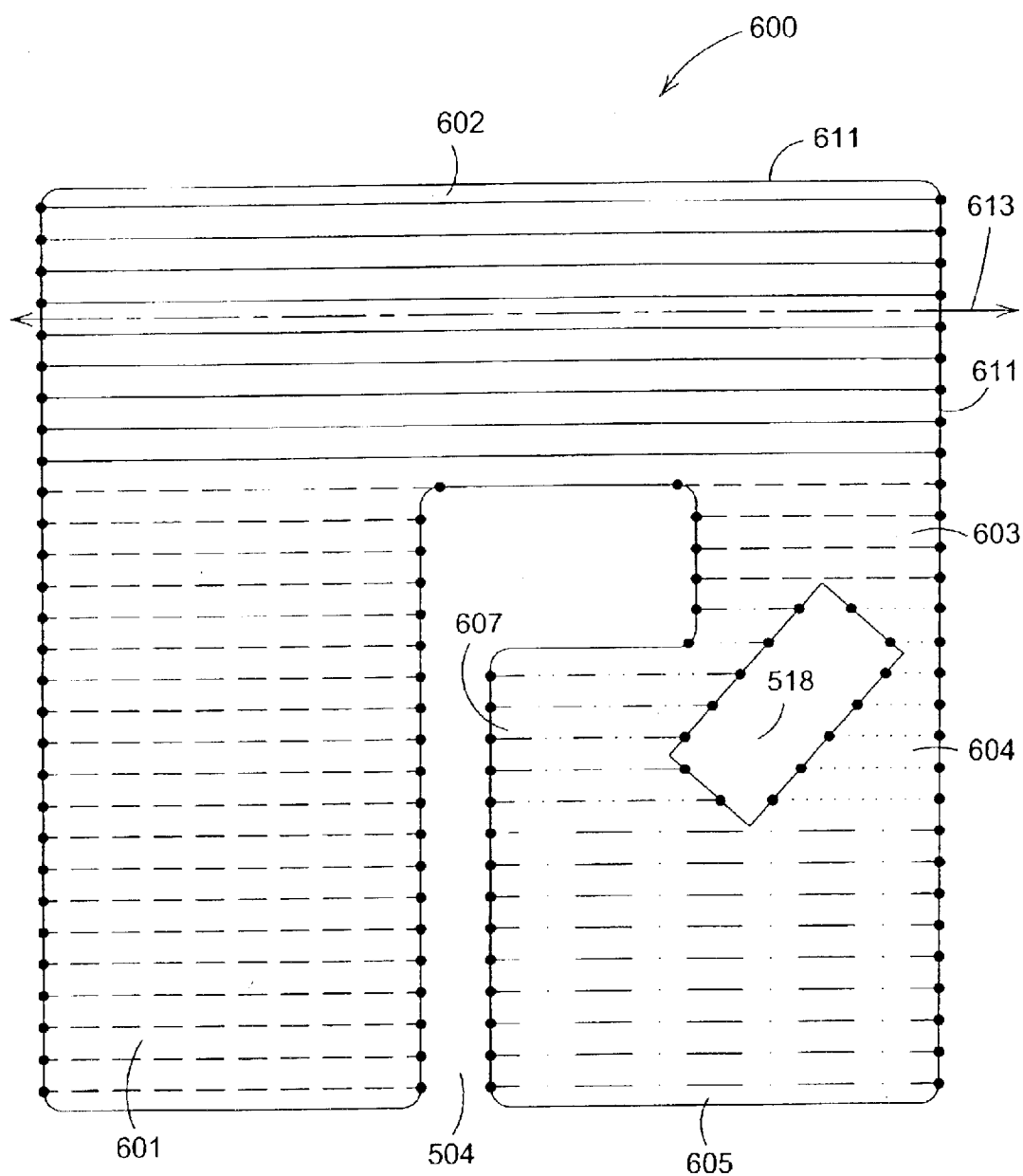
FIG. 6A shows a vehicle path for a work area that is partitioned into several partitions in accordance with the invention.

FIG. 6A illustrates a preferential path plan within a designated area or map object 611 with a concavity 504 and an obstruction 518. The designated area is decomposed or broken down into various partitions ( 601, 602, 603, 604, 605, 607) which may be generally rectangular or have other shapes. Although six partitions are shown in FIG. 6A, it is understood that any number of partitions greater than or equal to one may be used to cover or service a designated area. The partitions of FIG. 6A may be designated an alpha partition 601, a beta partition 602, a delta partition 603, an epsilon partition 604, a gamma partition 605, and an iota partition 607, wherein the prefixes alpha, beta, delta, epsilon, gamma, and iota serve as arbitrary identifiers that may be replaced with any other suitable alphanumeric identifiers.

The partitions may be processed in accordance with a sequence that minimizes travel distance between partitions or otherwise provides for economic handling of the partitions in a preferential sequential order. The rows within each partition are aligned with a target axis 613, where the target axis 613 is generally parallel to a boundary of the map object 611 or work area.

Figure 6B:
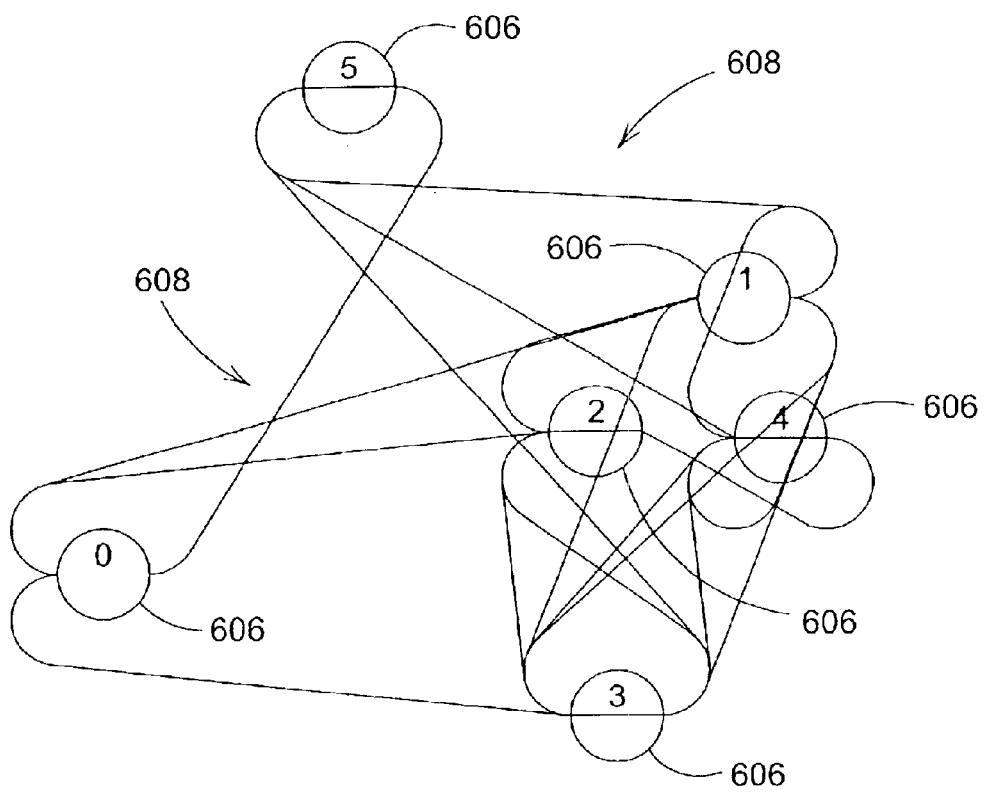
FIG. 6B shows a partition graph that shows possible routes between partitions of FIG. 6A.

FIG. 6B illustrates a partition graph 608 having multiple nodes 606. Each node 606 is associated with a corresponding partition of FIG. 6A. Each node 606 may be associated with a respective node identifier to facilitate distinguishing one node from another. Here, the node identifiers may be referred to as 0, 1, 2, 3, 4, and 5. Node identifier 0 is associated with the alpha partition 601; node identifier 1 is associated with the delta partition 603; node identifier 2 is associated with the iota partition 607; node identifier 3 is associated with the gamma partition 605; node identifier 4 is associated with the epsilon partition 604; and node identifier 5 is associated with the beta partition 602.

The curved line segments, straight line segments, and combinations thereof that interconnect the nodes 606 represent a partition graph 608. The partition graph 608 may show all or some of the possible candidate travel paths between the nodes 606 to facilitate the selection of an efficient path (e.g., an optimal path or a most efficient path) for the vehicle traversing the nodes 606.

Partitions with odd parity are shown with a horizontal line through the circle that indicates a node 606. As illustrated, node identifier 0 and node identifier 1 have even parities, which indicate that an even number of rows are present within the partition associated with the corresponding node identifier. The remaining partitions have odd parities, which indicate that an odd number of rows are present within the partition. The parities may vary with respect to the dimensions and shape of the designated portion of the work area to be processed, treated or otherwise traversed by the work vehicle.

Each partition is represented as a corresponding node 606 in a partition graph. Two nodes (that represent partitions) in the partition graph 608 are connected with an edge or path segment if they share a common shape (e.g., a portion of an obstacle). For example, both the epsilon partition 604 and the iota partition 607 have a common obstacle point or border that is associated with the same obstacle 518. If a vehicle had completed traversing the epsilon partition 604 and ended on the internal obstacle 518 after traversing the epsilon partition 604, then the preferential path plan may permit the vehicle to traverse along the border of the obstacle 518 to gain access to the iota partition 607. Once the vehicle accessed iota partition 607, the vehicle could traverse (e.g., mow) iota partition 607. Hence, an edge in a partition graph 608 may be used to connect two partitions as part of a preferential path or inter-partition path plan.

In one embodiment, the partition graph 608 may be represented by Unified Modeling Language (UML). A linear-time parsing algorithm is presented in the Unified Modeling Language (UML) documentation that identifies each partition and the relationships between the partitions, given a coverage problem. The Unified Modeling Language (UML) is an standard language convention for specifying, visualizing, constructing, and documenting various features of software.

Figure 7:
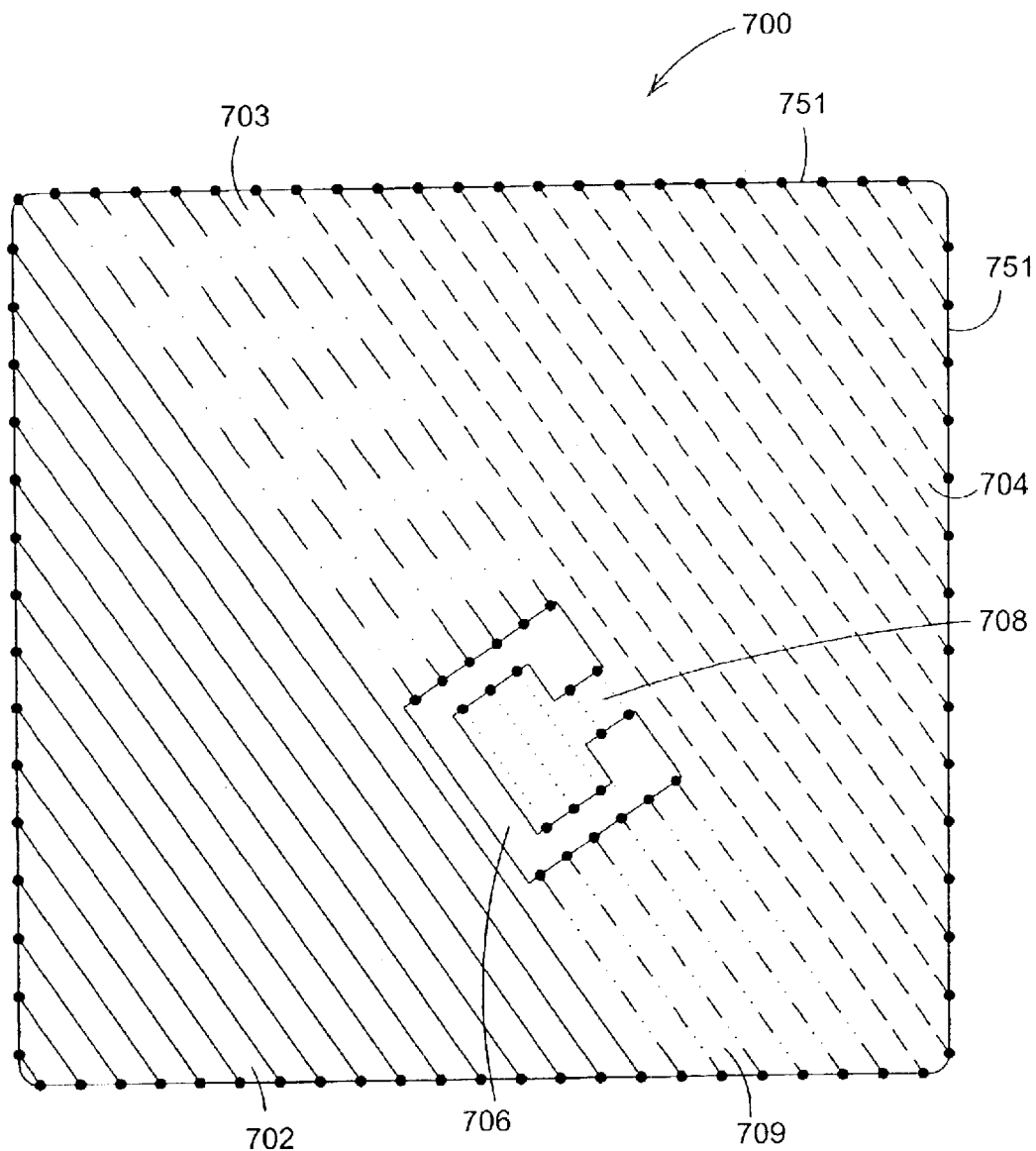
FIG. 7 shows an example of an obstructed partition which may be difficult or impossible for a vehicle to cover.

FIG. 7 may include a first partition 702, a second partition 703, a third partition 704, a fourth partition 708, and a fifth partition 709, although the actual number of partitions may differ in practice. The first partition 702 is indicated by solid lines and the second partition 703 is indicated by dashed lines. The third partition 704 is indicated by the alternating double dot-dash lines. The fourth partition 708 is indicated by dot-dash lines. The fifth partition 709 is indicated by another line type. Here, the fourth partition 708 may also be referred to as an isolated partition, which may be described as an internal partition within an obstacle that is difficult or impossible to reach with strict adherence to certain path planning rules. For example, if, under certain path planning rules, the work vehicle is only permitted to move along uniformly spaced, generally parallel rows and transfer from row to row along or outside of an outer boundary of the designated area 751, the work vehicle may not be able to enter the fourth partition 708 without violation of its authorized movement rules.

As shown in FIG. 7, the designated area 751 of a work area has an exclusion area or obstacle 706 that may render the isolated partition or fourth partition 708 difficult or impossible to reach For example, the fourth partition 708 or another isolated partition may be difficult to reach or unreachable because of vehicular constraints (e.g., a path requiring less than minimum turn radius or less than minimum vehicular width), vehicular movement rules or other constraints or reasons. Accordingly, in one embodiment, the preferential path plan may cover all reachable areas of the preferential path plan with the designated area 751 and alert the user about any unserviced or unreachable portion within the designed area 751.

The isolated partition or fourth partition 708 may be regarded as difficult to reach or unreachable because, given certain vehicular movement constraints, there is not any sequence of partitions (702, 703, 704, 708, and 709) that will allow the vehicle to access and traverse (e.g., mow) the fourth partition 708. The fourth partition 708 only borders the obstacle 706 and no rows from other partitions contact the intra-partition rows of the fourth partition 708. Further, both the second partition 703 and the fifth partition 709 touch the obstacle 706 and have even parity. The vehicle may move along the outside boundary of the obstacle 706. Since partitions (703 and 709) have even parity, and they both touch the outside boundary of the obstacle 706, the vehicle will remain on the outside boundary of the obstacle 706 following the traversing (e.g., mowing) of both partitions (703 and 709). Hence, the vehicle will remain on the outside shape and be unable to reach the obstacle 709, and therefore be unable to mow the internal obstacle partition 708.

In general, an isolated partition can be identified by a simple fixed-point calculation. Given a partial solution where the remaining partitions are in set P and the vehicle is known to be on the border of ShapeK, the following isolation identification algorithm will identify all unreachable shapes.

1) Let the set of unreachable shapes be U, initialized to all shapes minus ShapeK.

2) Let fixedpoint? be true.

3) While not(fixedpoint?) Do:

a. For each p in P Do:

b. If p is odd parity and on one side of p is ShapeA and on the other side is ShapeB and ShapeA is reachable, then: remove ShapeB from U.

c. If U has changed then set fixedpoint? to false.

4) Return U.

This isolation identification algorithm identifies all unreachable shapes as those that do not have an odd-parity partition connecting them to a reachable shape. The fixed-point calculation imposes the transitivity of the reachable relation between shapes that have an odd-parity partition connecting them. Once the unreachable shapes have been identified, isolated partitions are found by determining if any partition exists where both sides are unreachable. If any isolated partitions are found in a partial solution, the unreachable heuristic returns a very large number, which will always exceed the best-so-far value (even when no complete solution has been found). Accordingly, when the number exceeding a certain threshold is determined in accordance with the unreachable heuristic, a search engine (e.g., following a Bounded A* algorithm) may discard the partial solution.

To repair or compensate for a partition graph with isolated partitions, the following compensation procedure may be used to redefine partitions: First, a set of unreachable shapes is identified; second, an even partition, called the split partition, is identified that connects an unreachable shape with another reachable shape; third, the split partition is then divided or severed into two odd partitions; and fourth, the reachability for all of the partitions is recalculated or redetermined. By changing an even partition into two odd partitions, the unreachable shape becomes reachable, and so do any previously stranded or isolated partitions.

Figure 8:
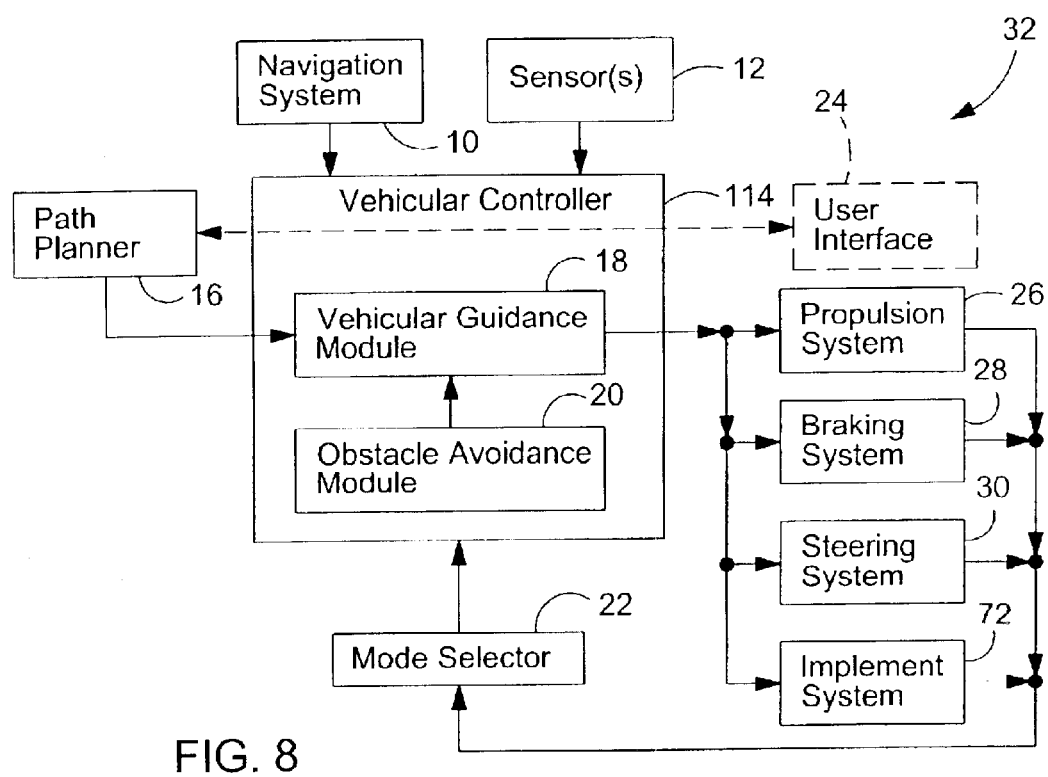
FIG. 8 is a block diagram of an alternate embodiment of a vehicular control system that may incorporate or support a path planning of this invention.

FIG. 8 is a block diagram of a vehicular control system that is similar to that of FIG. 1, except the vehicular controller 114 of FIG. 8 excludes the path planner 16 integrated therein. Rather, the path planner 16 of FIG. 8 is configured separately from the vehicular controller 114, but the path planner 16 and the vehicular controller 114 of FIG. 8 collectively perform the same functions as the vehicular controller 14 and the path planner 16 of FIG. 1. Like reference numbers in FIG. 1 and FIG. 8 indicate like elements.

Figure 9:
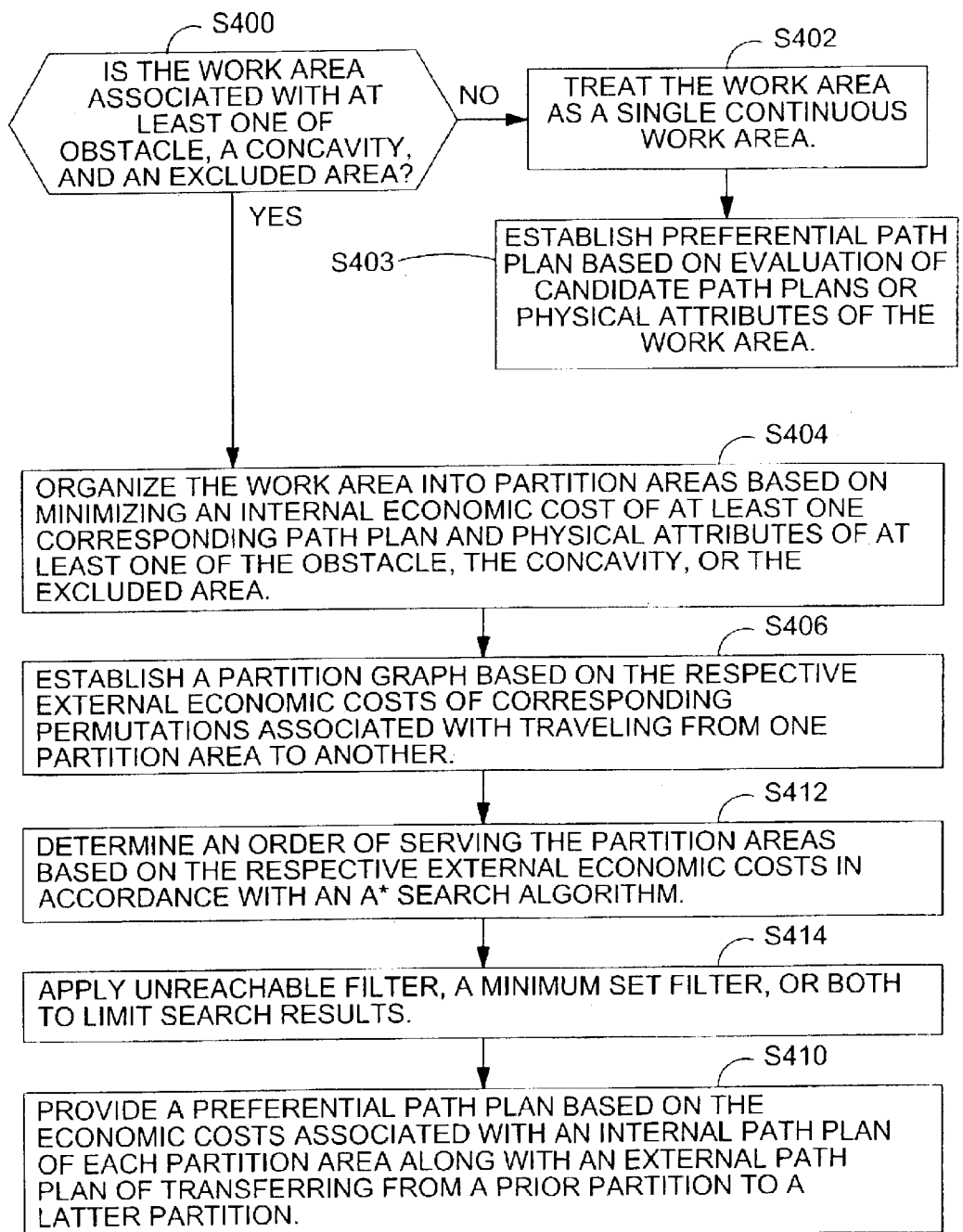
FIG. 9 is flow chart of an alternate embodiment of a method for determining an efficient vehicle path.

FIG. 9 is a flow chart of a method for determining a preferential path plan. The method of FIG. 9 is similar to the method of FIG. 4, except the method of FIG. 9 replaces step S408 with step S412 and adds new step S414. Like reference numbers in FIG. 9 and FIG. 4 indicate like procedures or steps.

In step S412, the path planner 16 determines an order of serving partition areas based on the respective external economic costs in accordance with an A* search algorithm. The external economic costs may include the distances or energy consumption for one or more of the following vehicular movements: a vehicle traveling from a vehicular starting location to a first partition of a work area, the vehicle traveling from one partition to another partition, the vehicle traveling from one partition to a last partition, and the vehicle traveling from an ending location associated with the last partition to a vehicular starting location. An external economic cost may be estimated for each permutation or combination of partition orders and possible external path plans. A search algorithm may be used to search among candidate path plans for a preferential path plan. Although a prodigious assortment of search algorithms may be used, the A* search algorithm and the Bounded A* search algorithm are two illustrative examples of search algorithms for finding a preferential path plan for the work vehicle to cover a designated portion of the work area.

The A* search algorithm and the Bounded A* search algorithm both use the following notation, constants, and functions:

S denotes a solution (either empty, partial or complete). A solution represents a path plan. A complete solution represents a preferential path plan. A partial solution represents an estimate or candidate path plan, which may or may not represent a preferential path plan.

W is a constant, a large negative number (such as −10,000). The user may define the threshold minimum number.

Depth(S) is the depth of the solution S (the count of the number of expansions it has had). An expansion is a potential solution or candidate path plan.

Q denotes a priority queue with priority function Score (S), where S is an item on the Queue.

Pop(Q) returns the lowest scoring item on the queue or data stack. The queue or data stack may represent a series of registers of data storage, magnetic data storage, optical data storage, memory, volatile computer memory or the like.

Push(Q, S) pushes S onto the queue Q or data stack.

Domain dependent functions:

G(S) the cost of the partial solution so far;

H(S) the estimated cost to complete the partial solution;

F(S) is simply G(S)+H(S), a lower bound on the final cost of S;

Expand(S) returns a list of new children solutions created by expanding the partial solution S;

Complete?( S) returns true when S is a complete solution; false otherwise.

In accordance with one technique for executing step S412, the A* Algorithm may be used to search for an optimal or preferential path plan solution to the partition graph in accordance with the following software instructions.

```
Let Score(S) = F(S)
Let S be the empty solution, push(Q, S)
Let best_solution = false
    While Not(best_solution)
        S = pop(Q)
            If Complete?(S) then
                best = S
            Else For all s | Expand(S)
                Do Push(Q,s)
Finally Return best
```

The above A* algorithm does not generally employ a bound to limit the computational iterations of possible candidate path plans and attendant computational resources. The first solution A* finds will be optimal so long as the H function never overestimates the true cost to complete the solution. Such an H function is called an admissible heuristic because it may be used to decide which solutions are considered complete and which are not.

In step S414, the path planner 16 may apply an unreachable filter, a minimum set filter, or both, to limit search results. Step S414 may be executed simultaneously with Step S416 or after step S412. The solution space for the preferential path plan is estimated and pruned to reduce the requirements for computational resources and time needed to reach a solution to a desired extent.

The unreachable filter detects when there is no way to successfully complete a partial path plan solution. Accordingly, a partial solution that may have remaining partitions to complete can be discarded immediately, rather than searching through the remaining combinations. Although the solution set may be estimated and downsized by applying a static unreachable filter, the partition graph or the partitions may be redetermined in an attempt to overcome an isolated partition deficiency. If the initial partition graph is determined to have one or more isolated partitions, the path planner 16 may redefine the partitions. The redefinition of the partitions may be referred to as repairing the partition graph to eliminate all isolated partitions. Once the partitions are redefined or the partition graph is repaired to eliminate all material isolated partitions, the search process may start or be resumed to find a preferential path plan from amongst the candidate path plans.

The minimum set filter determines a lower bound on the sum of the economic costs to get between the remaining partitions. By providing a limited range or tight bound, many partial solutions can be discarded early because the minimum set filter determines that the best cost to complete the discarded candidate path plan is greater than the best-so-far cost of the other solutions or candidate path plans still under consideration.

The solution set may be pruned by applying a minimum set filter. This minimum set filter is a heuristic that provides a tight bound on the remaining cost needed to connect together all the remaining partitions. This heuristic utilizes cost information pre-computed and stored on each partition. When the partition graph is built, for each partition j, the minimum cost from j to all other partitions is calculated and stored on j. Say a partial solution has U partitions left and is currently at partition k out of m partitions. The lower bound for the cost to complete this solution will be the sum of: (a) the minimum cost from k to any partition in U; and (b) for each partition p in U, the sum of the minimum cost from p to any other partition in U. In fact, this minimum set heuristic could overestimate the true cost because it will sum |U|+1 connecting costs when only |U| connecting costs will actually be in the solution. To correct for this, the minimum duplicated value in the (b) calculation is eliminated. It can be shown that the calculation of (b) will always include at least one duplicate value, so long as |U|>1.

Figure 10:
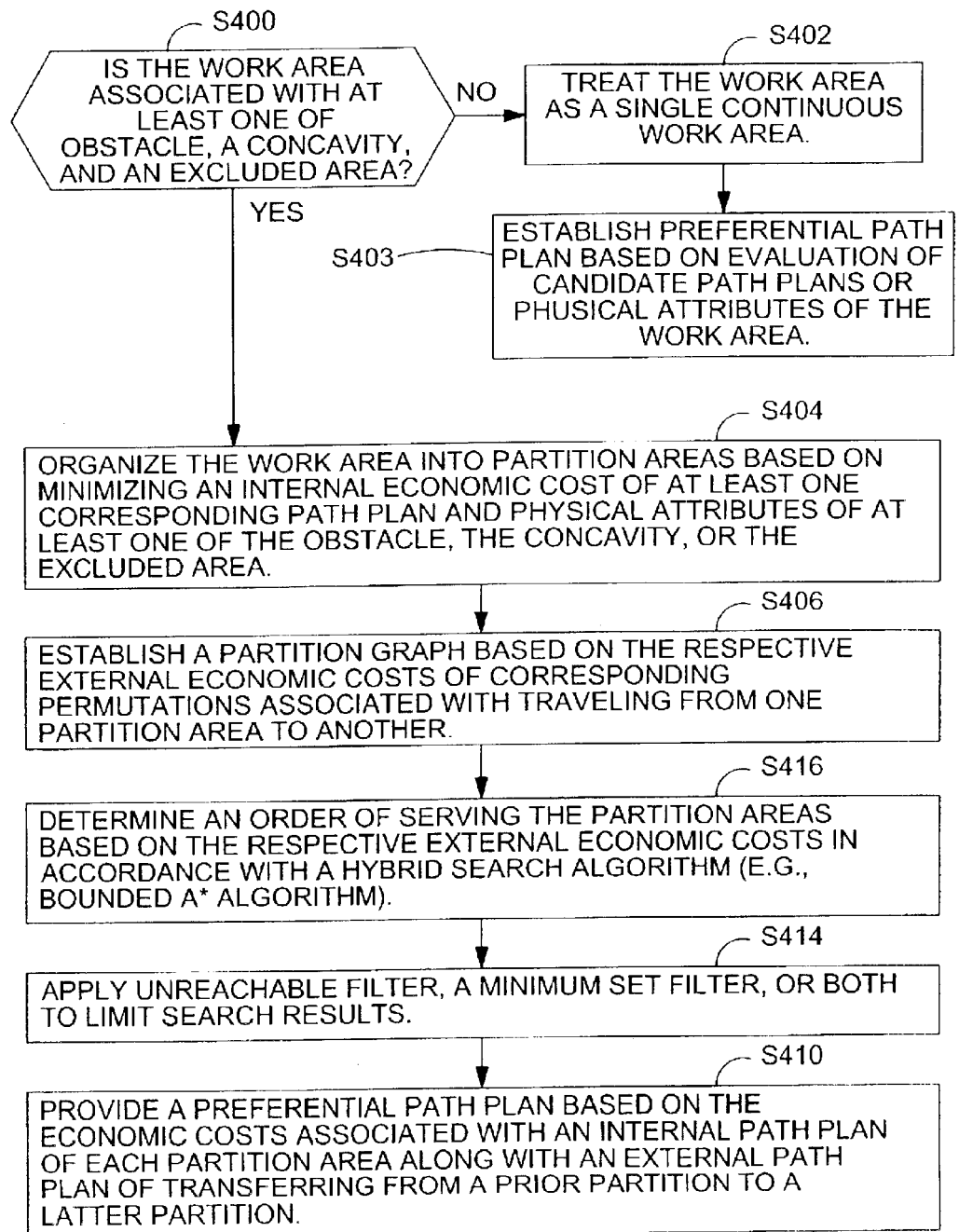
FIG. 10 is flow chart of another alternate embodiment of a method for determining an efficient vehicle path.

FIG. 10 is a flow chart of a method for determining a preferential path plan. The method of FIG. 10 is similar to the method of FIG. 4, except the method of FIG. 10 replaces step S408 with step S416 and adds new step S414. Like reference numbers in FIG. 10, FIG. 9, and FIG. 4 indicate like steps or procedures.

In step S416, a path planner 16 determines an order (e.g., preferential order) of serving the partition areas based on the respective external economic costs in accordance with a hybrid search algorithm derived from A* and branch and bound. The external economic costs may include the distances or energy consumption for one or more of the following vehicular movements: a vehicle traveling from a vehicular starting location to a first partition of a work area, the vehicle traveling from one partition to another partition, the vehicle traveling from one partition to a last partition, and the vehicle traveling from an ending location associated with the last partition to a vehicular starting location. The hybrid search algorithm may be referred to as the bounded A* algorithm.

In one embodiment, the Bounded-A* algorithm is used to perform the search through the partition graph to identify a preferential path plan. The Bounded A* algorithm winnows through candidate path plans to identify the solution to the preferential path plan. Searching is a powerful method for solving the classes of problems whose solutions cannot be directly calculated. The search methodology solves these problems by first representing a large space of possible solutions, then performing a search through this space starting at an empty solution and terminating at a complete and near-optimal solution. To clearly define this search process, it is necessary to define the components of the A* algorithm:

1) The initial solution: one of the partitions that border the outside shape may facilitate determination of the initial solution or a candidate path plan.

2) The cost of a solution: so far can be estimated by summing the costs of each of the edges employed between the partitions. There is no need to include the actual cost of traversing (e.g., mowing) each partition since all solutions will include all partitions.

3) The solution expansion function: takes a solution and returns a set of children solutions. Considering a partial solution whose last partition traversed (e.g., mowed) is j, which partitions could the solution be expanded to? The answer depends upon which side of partition j the solution arrived at and the parity of j. Say the solution arrived at the first side of j on Shape A; then, if the parity of the partition is even, the vehicle will finish partition j on the border of ShapeA. Hence, all untraversed (e.g., unmowed) partitions that have a side on ShapeA are candidates for expansion.

Alternatively, if the parity of the partition is odd, then the vehicle will finish partition j on the second side (say on ShapeZ), and all untraversed (e.g., unmowed) partitions that have a side on ShapeZ will be candidates for expansion.

The Bounded A* algorithm is a hybrid of the A* algorithm and the Branch and Bound algorithm, where solutions are expanded in a depth-first, best-first way, and a bound is used to terminate unneeded partial solutions. In this case, the best-so-far bound is compared to the F function value of each partial solution. Using the F value, rather than the G value, provides a tighter and therefore more effective bound. The Bounded A* algorithm may be expressed as follows, consistent with the earlier definitions of terms presented in conjunction with FIG. 9.

```
Let Score(S) = F(S) + W *Depth(S)
Let S be the empty solution, push(Q, S)
Let bound = ¥
    While Not(Empty?(Q))
S = Pop(Q)
    If Complete?(S) then
        If F(S) < bound then
            bound = F(S),
                best_so_far = S
    Else If F(S) < bound then
        For all s | Expand(S)
            Do If F(s) < bound then
                push(Q, s)
    Finally Return best_so_far.
```

The Bounded A* Algorithm does a depth-first search and thereby saves memory. The Bounded A* Algorithm uses its heuristic function F(s) to direct the search to focus on the most promising solutions during the forward search process. In addition, the heuristic function F(s) is used as a lower bound on s to terminate it early, if its value can never be better than the best-so-far solution.

Bounded A* combines techniques from both depth-first Branch-and-Bound and A* to produce an algorithm that: (a) Finds a reasonable solution quickly, (b) incrementally improves the solution given more Central Processing Unit (CPU) time, (c) uses only memory bounded linearly in the solution depth, and (d) enables control knowledge to be incorporated into the search process. Branch-and-bound is a classic approach developed by the operations research community for solving discrete combinatorial optimization problems. The advantages of depth-first branch-and-bound are that a solution is often found quickly, and memory requirements are minimized. However, the optimal solution is only found following an exhaustive search. Another method developed from the Artificial Intelligence community is A*. The advantage of A* is that the optimal solution is found first, and control knowledge can be incorporated into the algorithm to speed the progress. However, A* can require an exponential amount of memory, and may not produce a solution within a reasonable time limit. A hybrid method, referred to as Bounded-A*, captures desirable attributes of both the A*algorithm and the Bounded A* algorithm.

In step S414, a path planner applies an unreachable filter, a minimum set filter, or both, to limit search results. Step S414 may be executed simultaneously with Step S416 or after step S416. The Bounded A* algorithm applies one or more admissible heuristic functions to focus the search on the most promising partial solutions and to prune the search tree early. For example, an admissible heuristic may include the unreachable filter, the minimum set filter, or both, to improve the performance of the search engine.

The method of FIG. 10 supports the use of a partition graph to enable complex coverage problems to be compactly represented and analyzed. When combined with the Bounded A* algorithm and the two admissible heuristics of step S414, as embodied by the unreachable filter and the minimum set filter, an effective and efficient algorithm results that can be implemented on an embedded processor and rapidly solve complex coverage problems.

The method and system of the invention may apply a simple abstraction that provides ready solutions to complex vehicular coverage and path planning problems. Accordingly, if the work area has a known number of internal obstacles and is represented as a partition graph with a limited number of nodes, the path planner can provide a path planning solution with a heap size of less than a desired maximum number of states. This simplification enables the path planning to be effectively implemented in embedded processors or other processors which are associated with limited memory resources. In one embodiment, the search is performed by the Bounded-A* search algorithm or another search algorithm which rapidly finds a satisfying solution, then incrementally improves it with additional computational processing time, where available.

Work vehicles that safely adhere to a planned path may be used to eliminate or reduce the exposure of a human operator to chemicals, fertilizer, herbicides, insecticides, dust, allergens, exhaust fumes, environmental conditions, slopes, low-hanging branches, and other hazards that might be harmful or irritating to an operator. Further, the planned path of a work vehicle may be completed with precision which equals or exceeds that of a human operator to obtain a desired aesthetic appearance. Modern day applications of the method and system include clearing minefields, mowing fairways, plowing fields, searching to rescue, securing an area, and countless other uses.

Having described the various embodiments, it will become apparent that various modifications can be made without departing from the scope of the invention as defined in the accompanying claims.

We claim:

1. A method of determining a path plan for a vehicle, the method comprising:
   organizing a work area into partition areas based on at least one of an obstacle, a concavity, and an exclusion area associated with the work area;
   establishing an external cost indicator for indicating an economic cost corresponding to the vehicle traversing from one partition area to another partition area for each possible permutation or potential combination of successive partition areas;
   searching the established external cost indicators to determine a preferential order of traversing the partition areas, each of the external cost indicators being based on the distance of a transfer path between a candidate prior partition and a candidate subsequent partition; and
   determining a preferential path plan based on the internal path plan of each partition and an external path plan of transferring from prior partition to a latter partition until each partition in the work area is traversed.

2. The method according to claim 1 wherein each of the partition areas comprises a region selected from the group consisting of a generally triangular region, a generally trapezoidal region, and a generally rectangular region.

3. The method according to claim 1 wherein each partition area is defined by a first boundary intersecting with adjacent path rows and by a second boundary intersecting with said adjacent path rows.

4. The method according to claim 1 wherein the searching finds the preferential order based on a substantially global lowest cost of traversing candidate external path plans and candidate internal path plans, the global lowest cost defined as a function of a remaining distance of remaining paths plus a cost of traversed paths traversed so far.

5. The method according to claim 1 wherein the searching finds the preferential order based on a substantially local lowest cost of traversing candidate transfer path plans and candidate internal path plans, the local lowest cost estimated to be less than or equal to children local costs derived from parameters associated with the local lowest cost.

6. The method according to claim 1 wherein the internal path plan comprises a series of generally parallel rows arranged at a defined angle with respect to a target axis, the generally parallel rows being interconnected by at least one of a loop and an interconnection segment.

7. The method according to claim 1 wherein the searching comprises applying an A* search algorithm to determine the preferential order within the preferential path plan.

8. The method according to claim 1 wherein the searching comprises applying a bounded A* search algorithm to determine the preferential order within the preferential path plan.

9. The method according to claim 1 wherein the searching comprises applying a minimum set filter to limit a number of candidate path plans to be considered for selection as the preferential path plan.

10. The method according to claim 1 wherein the searching comprises applying an unreachable filter to limit the detection of one or more isolated partitions that are difficult to access to limit a number of candidate path plans to be considered for selection as the preferential path plan.

11. The method according to claim 10 further comprising:
redefining the organized partition areas to eliminate any isolated partitions;
searching the redefined partition areas to determine the preferential path plan.

12. A system of determining a path plan for a vehicle, the system comprising:
an organizer for organizing a work area into partition areas based on at least one of an obstacle, a concavity, and an exclusion area associated with a work area;
a cost estimator for establishing an external cost indicator for indicating an external economic cost corresponding to the vehicle traversing from one partition area to another partition area for each possible permutation or potential combination of successive partition areas;
a search engine for searching the established eternal cost indicators to determine a preferential order of traversing the partition areas, each of the external cost indicators being based on the distance of a transfer path between a candidate prior partition and a candidate subsequent partition;
a path determination module for determining a preferential path plan based on the internal path plan of each partition and an external path plan of transferring from a prior partition to a latter partition until each partition in the work area is traversed.

13. The system according to claim 12 wherein each of the partition areas comprises a region selected from the group consisting a generally triangular region, a generally trapezoidal region, and a generally rectangular region.

14. The system according to claim 12 wherein each partition area is defined by a first boundary intersecting with adjacent path rows and by a second boundary intersecting with said adjacent path rows.

15. The system according to claim 12 wherein the search engine is arranged to find a substantially global lowest cost of traversing candidate external path plans and candidate internal path plans; the global lowest cost defined as a function of a remaining distance of remaining paths plus a cost of traversed paths traversed so far; the substantially global lowest cost being associated with a corresponding order of partition execution as the preferential order.

16. The system according to claim 12 wherein the search engine is arranged to find a substantially local lowest cost of traversing candidate transfer path plans and candidate internal path plans; the local lowest cost estimated to be less than or equal to children local costs derived from parameters associated with the local lowest cost; the substantially local lowest cost being associated with a corresponding order of partition execution as the preferential order.

17. The system according to claim 12 wherein the internal path plan comprises a series of generally parallel rows arranged at an defined angle with respect to a target axis, the generally parallel rows being interconnected by at least one of a loop and an interconnection segment.

18. The system according to claim 12 wherein the search engine applies an A* search algorithm to determine the preferential path plan.

19. The system according to claim 12 wherein the search engine applies a bounded A* search algorithm to determine the preferential path plan.

20. The system according to claim 12 wherein the search engine applies a minimum set filter to limit a number of candidate path plans to be considered for selection as the preferential path plan.

21. The system according to claim 12 wherein the search engine applies an unreachable filter to limit detection of one or more isolated partitions that are difficult to access to limit a number of candidate path plans to be considered for selection as the preferential path plan.

22. The system according to claim 21 wherein the organizer redefines the partition areas to eliminate any isolated partitions; and wherein the search engine searches the redefined partition areas to determine the preferential path plan.

23. A method of determining a path plan for vehicle, the method comprising:
organizing a work area into partition areas comprising regions containing a set of rows for traversal by a vehicle, each partition area being positioned based on a location of at least one of an obstacle, a concavity, and an exclusion area associated with the work area;
establishing an external cost indicator for indicating an economic cost corresponding to the vehicle traversing from one partition area to another partition area for each possible permutation or potential combination of successive partition areas;
searching the established external cost indicators to determine a preferential order of traversing the partition areas; and
determining a preferential path plan based on the internal path plan of each partition and an external path plan of transferring from a prior partition to a latter partition until each partition in the work area is traversed.

24. The method according to claim 23 further comprising determining boundaries of each partition comprising a first row and a second row satisfying at least the following requirements: (a) a first shape of an obstacle touched by a top or end of the first row being the same first shape touched by the top or end of the second row; and (b) a second shape of an obstacle touched by a bottom or opposite end of the first row being the same second shape touched by the bottom or opposite end of the second row.

25. The method according to claim 23 wherein each of the partition areas comprises a region selected from the group consisting of a generally triangular region, a generally trapezoidal region, and a generally rectangular region.

26. The method according to claim 23 wherein each partition area is defined by a first boundary intersecting with adjacent path rows and by a second boundary intersecting with said adjacent path rows.

27. The method according to claim 23 wherein each of the external cost indicators is based on the distance of a transfer path between a candidate prior partition and a candidate subsequent partition.

28. The method according to claim 23 wherein the searching finds the preferential order based on a substantially global lowest cost of traversing candidate external path plans and candidate, internal path plans, the global lowest cost defined as a function of a remaining distance of remaining paths plus a cost of traversed paths traversed so far.

29. The method according to claim 23 wherein the searching finds the preferential order based on a substantially local lowest cost of traversing candidate transfer path plans and candidate internal path plans, the local lowest cost estimated to be less than or equal to children focal costa derived from parameters associated with the local lowest cost.

30. The method according to claim 23 wherein the internal path plan comprises a series of generally parallel rows arranged at a defined angle with respect to a target axis, the generally parallel rows being interconnected by at least one of a loop and an interconnection segment.

31. The method according to claim 23 wherein the searching comprises applying an A* search algorithm to determine the preferential order within the preferential path plan.

32. The method according to claim 23 wherein the searching comprises applying a bounded A* search algorithm to determine the preferential order within the preferential path plan.

33. The method according to claim 23 wherein the searching comprises applying a minimum set filter to limit a number of candidate path plans to be considered for selection as the preferential path plan.

34. The method according to claim 23 wherein the searching comprises applying an unreachable filter to limit the detection of one or more isolated partitions that are difficult to access to limit a number of candidate path plans to be considered for selection as the preferential path plan.

35. The method according to claim 34 further comprising:
redefining the organized partition areas to eliminate any isolated partitions;
searching the redefined partition areas to determine the preferential path plan.

* * * * *